United States Patent
Grancharov et al.

(10) Patent No.: US 7,496,636 B2
(45) Date of Patent: Feb. 24, 2009

(54) METHOD AND SYSTEM FOR RESOLVING UNIVERSAL RESOURCE LOCATORS (URLS) FROM SCRIPT CODE

(75) Inventors: Constantine Grancharov, Ottawa (CA); Andrew Rolleston, Ottawa (CA); Duncan Smith, Kanata (CA)

(73) Assignee: International Business Machines Corporation, Armonk, NY (US)

(*) Notice: Subject to any disclaimer, the term of this patent is extended or adjusted under 35 U.S.C. 154(b) by 244 days.

(21) Appl. No.: 10/064,176

(22) Filed: Jun. 19, 2002

(65) Prior Publication Data

US 2004/0143787 A1    Jul. 22, 2004

(51) Int. Cl.
*G06F 15/16* (2006.01)
*G06F 3/00* (2006.01)
*G06F 7/00* (2006.01)
*G06F 12/00* (2006.01)
*G06F 17/30* (2006.01)

(52) U.S. Cl. .................... 709/217; 709/218; 709/201; 709/203; 709/217; 709/200; 715/738; 707/3; 707/200; 707/202

(58) Field of Classification Search ................ 709/224, 709/218, 204; 705/14; 707/200
See application file for complete search history.

(56) References Cited

U.S. PATENT DOCUMENTS

| | | | |
|---|---|---|---|
| 5,974,572 A | 10/1999 | Weinberg et al. | |
| 5,999,929 A | 12/1999 | Goodman | |
| 6,253,204 B1 | 6/2001 | Glass et al. | |
| 6,424,966 B1* | 7/2002 | Meyerzon et al. | 707/3 |
| 6,665,658 B1* | 12/2003 | DaCosta et al. | 707/3 |
| 6,668,369 B1* | 12/2003 | Krebs et al. | 717/125 |
| 6,701,350 B1* | 3/2004 | Mitchell | 709/217 |
| 6,857,124 B1* | 2/2005 | Doyle | 719/316 |
| 2002/0013782 A1 | 1/2002 | Ostroff et al. | |
| 2002/0052928 A1* | 5/2002 | Stern et al. | 709/218 |
| 2002/0078136 A1* | 6/2002 | Brodsky et al. | 709/203 |
| 2002/0099723 A1* | 7/2002 | Garcia-Chiesa | 707/200 |
| 2002/0107848 A1* | 8/2002 | Brown et al. | 707/3 |
| 2002/0147637 A1* | 10/2002 | Kraft et al. | 705/14 |
| 2002/0169801 A1* | 11/2002 | Barnes et al. | 707/513 |
| 2002/0188717 A1* | 12/2002 | Mushlin et al. | 709/224 |
| 2002/0194161 A1* | 12/2002 | McNamee et al. | 707/2 |
| 2003/0084034 A1* | 5/2003 | Fannin | 707/3 |
| 2007/0282818 A1* | 12/2007 | Lynn et al. | 707/3 |

* cited by examiner

*Primary Examiner*—John Follansbee
*Assistant Examiner*—Karen C Tang
(74) *Attorney, Agent, or Firm*—Seth H. Ostrow; Dreier LLP

(57) ABSTRACT

A system and method are disclosed for resolving Universal Resource Locators (URLs). The URL resolving system examines the script code to obtain URLs from the examination output in the context of website crawling.

25 Claims, 5 Drawing Sheets

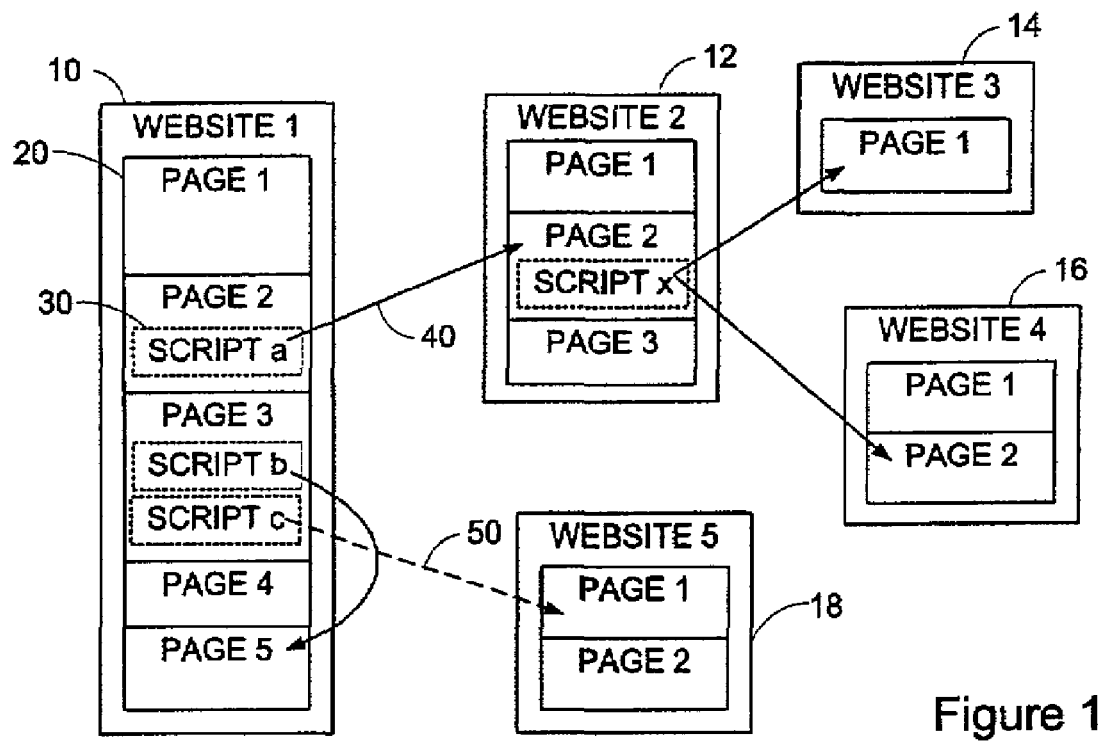
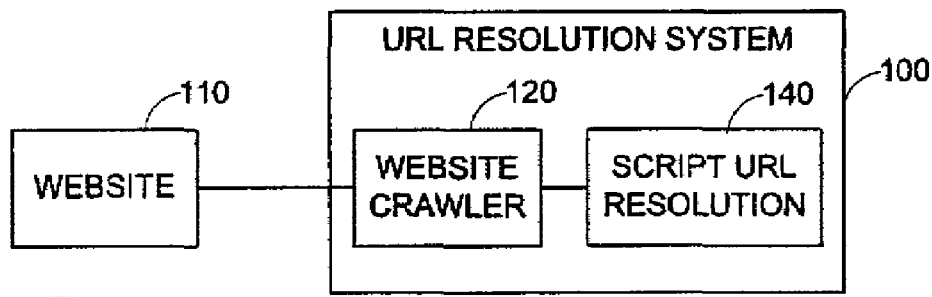
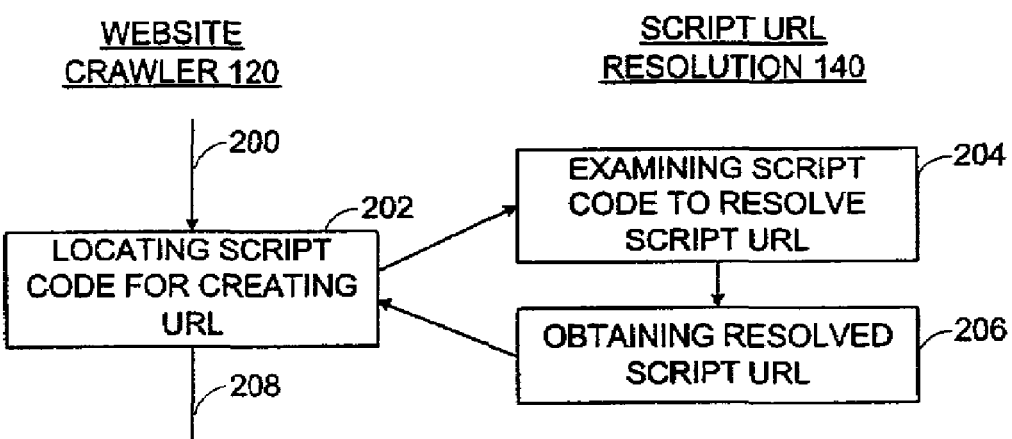

METHOD AND SYSTEM FOR RESOLVING UNIVERSAL RESOURCE LOCATORS (URLS) FROM SCRIPT CODE

BACKGROUND OF INVENTION

This invention relates to a method and system for resolving Universal Resource Locators (URLs) from script code located in websites for the purpose of website crawling.

The World Wide Web available on the Internet provides a variety of specially formatted documents called web pages. The web pages are traditionally formatted in a language called HTML (HyperText Markup Language). Many web pages include links to other web pages which may reside in the same website or in a different website, and allow users to jump from one page to another simply by clicking on the links. The links use Universal Resource Locators (URLs) to jump to other web pages. URLs are the global addresses of web pages and other resources on the World Wide Web.

As web technology evolves, websites become more and more complex. The tendency in website development is to move from using purely static HTML to using HTML and script code to provide enhanced functionality. As a result, it is now common to use script code to construct web page links, i.e., to create URLs dynamically. Often the process of dynamically constructing URLs involves many variables and some rather complex script code. This makes it very difficult to resolve, i.e., extract and obtain, such URLs, when it comes to website crawling.

Website crawling or spidering is a process to automatically scan contents of websites by following links and fetching the web pages. Web crawling agents or "spiders" are software programs for performing the crawling over websites. Typically, existing web crawling agents are used to find specific information of interest in the Web.

Before the introduction of script code into Web pages, crawling agents could parse HTML code for standard URLs. Since all URLs had to be coded to the HTML specification, this task was relatively easy. However, as sites evolved they increasingly relied upon script code to provide more advanced functionality that standard HTML did not allow for. The format of the URLs in the script code varies widely from implementation to implementation. Unlike static HTML, there is no standard that the script code must follow for encoding URLs. Accordingly, script code presents problems for crawling agents that need to parse URLs. There is no longer a common syntax or format for the URLs and thus they are difficult to find consistently.

An existing approach to this problem is to use customizable pattern matching algorithms that statically read through the script code on a page or in a script file, and based on pattern matching try to "guess" what in that script code might be a URL. The pattern matching provides some utility but the use of the pattern matching algorithms has two basic problems: 1) the algorithms invariably miss URLs in the script code and 2) the algorithms do not always extract the entire URL correctly.

It is therefore desirable to provide a new mechanism that can more accurately resolve URLs from script code embedded in web pages.

SUMMARY OF INVENTION

It is an object of the invention to provide a novel system and method for more accurately resolving Universal Resource Locators (URLs) from script code.

The present invention examines the script code to obtain URLs from the output in the context of website crawling.

In accordance with an aspect of the present invention, a URL resolution system for resolving Universal Resource Locators (URLs) is provided. The URL resolution system comprises a website crawler for crawling a website and for locating script code which is used to dynamically create at least one script URL; and a script URL resolution component for causing examination of the script code located during the crawling to obtain the script URL.

In accordance with another aspect of the present invention, a method for resolving Universal Resource Locators (URLs) is provided. The method comprises steps of locating script code which creates at least one script URL while crawling a website; and examining the script code to obtain the script URL from the examination result.

In accordance with another aspect of the present invention, a computer readable medium storing the instructions and/or statements for use in the execution in a computer of the method for resolving Universal Resource Locators (URLs) is provided.

In accordance with another aspect of the present invention, there is provided electronic signals for use in the execution in a computer of the method for resolving Universal Resource Locators (URLs).

In accordance with another aspect of the present invention, there is provided a computer program product for use in the execution in a computer of a method for resolving Universal Resource Locators (URLs). The computer program product comprises a module for locating script code which creates at least one script URL while crawling a website; and a module for examining the script code to obtain the script URL from the examination result.

Other aspects and features of the present invention will be readily apparent to those skilled in the art from a review of the following detailed description of preferred embodiments in conjunction with the accompanying drawings.

BRIEF DESCRIPTION OF DRAWINGS

The invention will be further understood from the following description with reference to the drawings in which:

FIG. 1 is a diagram showing an example of websites having script code;

FIG. 2 is a block diagram showing a URL resolution system in accordance with an embodiment of the present invention;

FIG. 3 is a flowchart showing a method for resolving a URL in accordance with an embodiment of the present invention;

DETAILED DESCRIPTION

Figure 4:
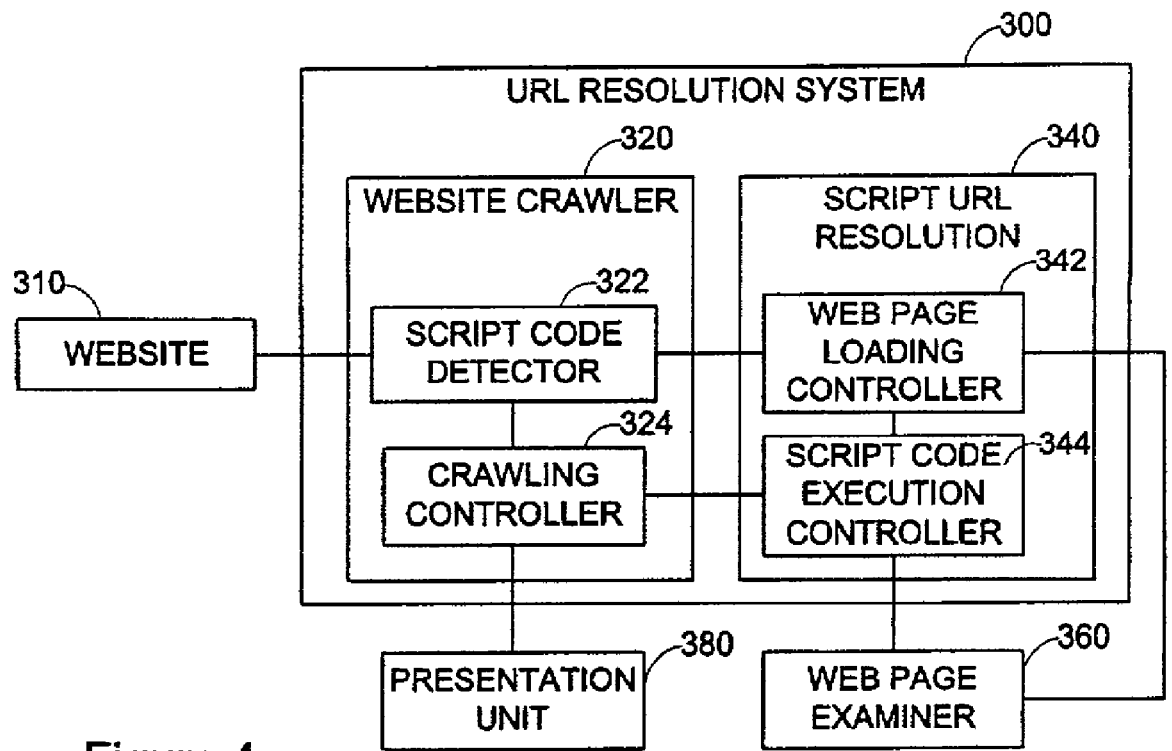
FIG. 4 is a block diagram showing a URL resolution system in accordance with another embodiment of the present invention.

The present invention is suitably used to check the integrity of links in a website. For example, a website 10 shown in FIG. 1 contains web pages or documents 20, some of which have embedded script code 30 which is used to dynamically create URLs. URLs created by the script code are called script URLs hereinafter. Each script URL may designate a local web page located within the same website or a remote web page located in a different website.

For example, in FIG. 1, page 2 of website 1 has script code a which is used to create a script URL identifying page 2 of website 2; page 3 of website 1 has script code b which is used to create a script URL identifying page 5 of website 1, and so on. More than one set of script code may be embedded in a single web page. A single set of script code may create one or more script URLs. The script code typically has a specific part that is used to create one or more script URLs. The entire script code may form the specific part.

Script code for dynamically creating script URLs may be JavaScript, JScript or VBScript and others.

FIG. 1 schematically represents that script code a in page 2 of website 1 can be successfully resolved to create link 40 to page 2 of website 2. However, script code c in page 3 of website 1 cannot be successfully resolved because of an error in the script code or other reasons, and accordingly, the link as represented by broken arrow 50 is unresolvable.

FIG. 2 shows a URL resolution system 100 in accordance with an embodiment of the present invention. The URL resolution system 100 comprises a website crawler 120 and a script URL resolution component 140. As shown in FIG. 3, the website crawler 120 scans or crawls website 110 (200). When it encounters or locates script code in the website 110 that is used to dynamically create one or more script URLs (202), the script URL resolution component 140 causes examination of the script code to resolve its script URL or URLs (204). From the examination output, the script URLs are obtained (206). The crawling is continued to locate any other script code that is used to dynamically create one or more URLs (208).

The examination of script code at step 204 may be carried out by explicitly executing the script code. Alternatively, it may be done by examining the script code to obtain the script URLs without explicitly executing the script code. The script URL resolution component 140 may examine the script code or it may use another component to examine the script code, as described below in relation with other embodiments.

Therefore, the URL resolution system 100 allows automatic resolution of script URLs from embedded script code in websites in the context of website crawling, i.e., by locating script code while crawling a website or websites. Since the script code is examined to dynamically obtain the script URLs, complete URLs can be accurately obtained. Unlike the conventional pattern matching which resolve URLs statically, there are minimal possibilities that the URL resolution system 100 will miss script URLs in the website that is being crawled. Thus, the URL resolution system 100 produces accurate results of website crawling.

The URL resolution system 100 may have a function by which users can set the extent of the crawling, as described below.

Figure 5:
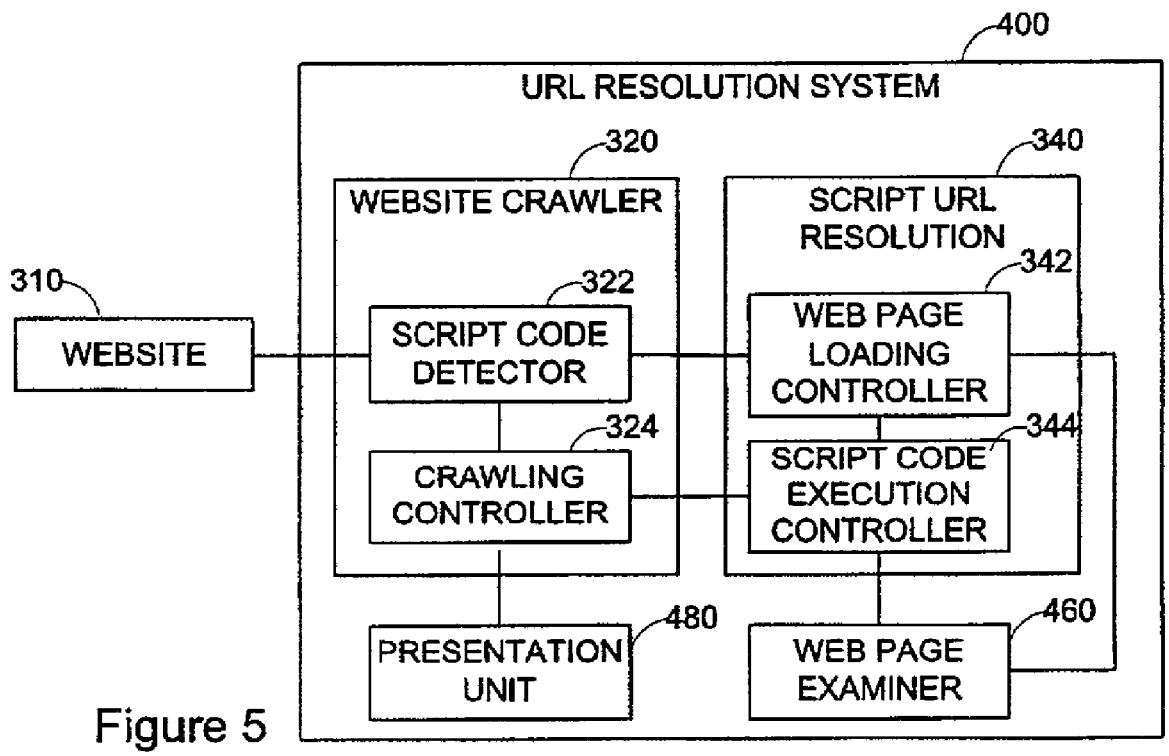
FIG. 5 is a block diagram showing a URL resolution system in accordance with another embodiment of the present invention.

Other embodiments of the present invention are described referring to FIGS. 4 and 5. A URL resolution system 300 shown in FIG. 4 comprises a website crawler 320 and a script URL resolution component 340.

The website crawler 320 has script code detector 322 and crawling controller 324. OLE_LINK2The crawling controller 324 OLE_LINK2controls crawling carried out by the website crawler 320. The crawling controller 324 controls the website crawler 320 to crawl individual web pages included in website 310 or other websites to locate web pages that use script code to dynamically create script URLs. The crawling controller 324 receives output of the script URL resolution component 340 and uses the output to control the website crawler 320, as further described below.

To locate web pages that use script code to dynamically create script URLs, the website crawler 320 uses the script code detector 322 to determine if the script code contained in the web page should be executed by determining if it uses a specific part of the script code to dynamically create at least one script URL. The script code detector 322 issues a notification to the script URL resolution component 340 when a web page having such script code is found. The notification includes an identification of the web page.

The script URL resolution component 340 is activated in response to a notification generated by the script code detector 322 of the website crawler 320. The website crawler 320 crawls all web pages on the original website, but it only passes the web pages containing relevant script code to the script URL resolution component 340.

The script URL resolution component 340 controls a web page examiner 360. The web page examiner 360 is a component capable of loading the contents of web pages and executing the entire or a specific part of script code in the loaded web pages. The web page examiner 360 may be a web browser having these functions, or a combination of a web page parser and a script code examiner. The URL resolution system 300 uses an external web page examiner 360. Alternatively, as shown in FIG. 5, an internal web page examiner 460 may be provided within the URL resolution system 400.

The script URL resolution component 340 has a web page loading controller 342 and a script code execution controller 344. The web page loading controller 342 notifies or instructs the web page examiner 360 to load relevant web pages. The script code execution controller 344 instructs the web page examiner 360 to execute specific parts of the script code that will result in dynamically created script URLs. For example, when the script URL resolution component 340 receives a notification from the script code detector 322, the web page loading controller 342 instructs the web page examiner 360 to load the contents of the web page identified in the notification. Then, the script code execution controller 344 executes the script code by interfacing with the web page examiner 360 and using its interface functions to force the execution of the specific parts of the script code in the loaded web pages. The web page examiner 360 captures the script URL(s) resulting from the script code execution and returns these script URLs to the script code execution controller 344. The script code execution controller 344 may instruct the web page examiner 360 to execute the entire script code, rather than only the specific parts thereof.

The script code execution controller 344 outputs the execution results to the website crawler 320. When the execution of the script code is successful, the execution result includes one or more resolved script URLs. When the execution of the script code is unsuccessful, the execution result includes a failure result.

The URL resolution systems 300, 400 may also have a presentation unit 480 or use an external presentation unit 380 to present to users the execution results. The presentation unit 380, 480 may be a user interface, a result log file, an email or other output unit or form. The execution results presented to users may include only the failure results or only resolved script URLs or both. Thus, an administrator of the website may attend to the failures.

Users may also use an input unit (not shown) to initiate or terminate the crawling, or set parameters of the crawling controller 324. For example, the crawling controller 324 may be set such that it crawls a website regularly in a predetermined interval and/or it may start crawling when the website is modified. Also, users may set the extent of the crawling, i.e., users may set the website crawler 320 to crawl only within the original website from which the crawling is initiated, or allow crawling of web pages residing in external websites when web pages in the external websites are linked. In the latter case, it is desirable to limit the extent or depth of the crawling of the external websites. For example, in FIG. 1, the system 100 may allow crawling of only website 1, allow crawling of web pages in secondary website 2 in addition to the originating website 1 only, or further allow crawling of tertiary websites 3 and 4.

Figure 6:
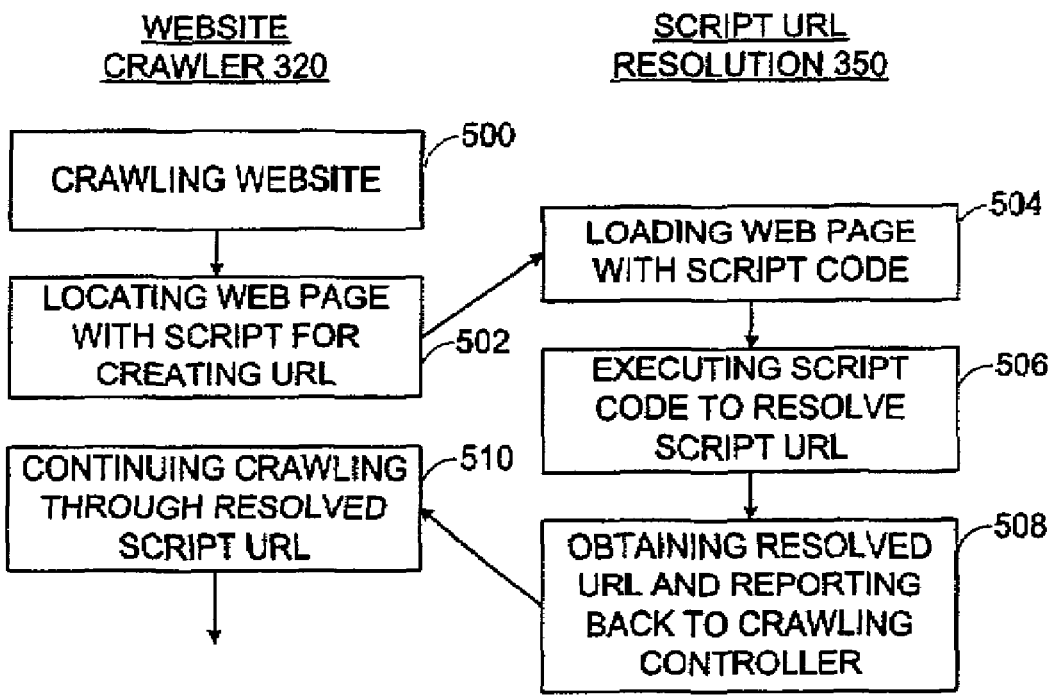
FIG. 6 is a flowchart showing a method for resolving a URL in accordance with another embodiment of the present invention.

FIG. 6 describes the process of resolving script URLs by script execution in the context of website crawling in accordance with an embodiment of the present invention. The process will be described referring to the URL resolution system 300 shown in FIG. 4. However, different systems, such as system 400 shown in FIG. 5, may also be used.

The website crawler 320 crawls a website 310 (500). Crawling of website 310 may start anywhere in the website 310. During the crawling, the script code detector 322 checks script code embedded in each web page in the website 310 to determine if the web page uses script code to dynamically create one or more script URLs. When the script code detector 322 locates a web page with script code that dynamically creates one or more script URLs (502), the script URL resolution component 340 is activated. The script code detector 322 sends a notification to the script URL resolution component 340 to this end.

In the script URL resolution component 340 the web page loading controller 342 instructs the web page examiner 360 to load the web page with the script code (504). The script code execution controller 344 then instructs the web page examiner 360 to execute the specific interface methods or functions that dynamically execute the script code and create one or more script URLs (506). The script code execution controller 344 may instruct the web page examiner 360 to execute the entire script code or only the relevant portions of the script code. Script URLs are thus resolved by the script code execution. The script code execution controller 344 receives the resolved script URLs from the web page examiner 360, and sends the received script URLs back to the crawling controller 324 (508).

The website crawler 320 continues the crawling (510). It may continue crawling on web pages identified by the resolved script URLs. The website crawler 320 may crawl those web pages immediately when the resolved script URLs are returned, or put them in a queue for crawling at a later time. The website crawler 320 may crawl multiple web pages in parallel.

Figure 7:
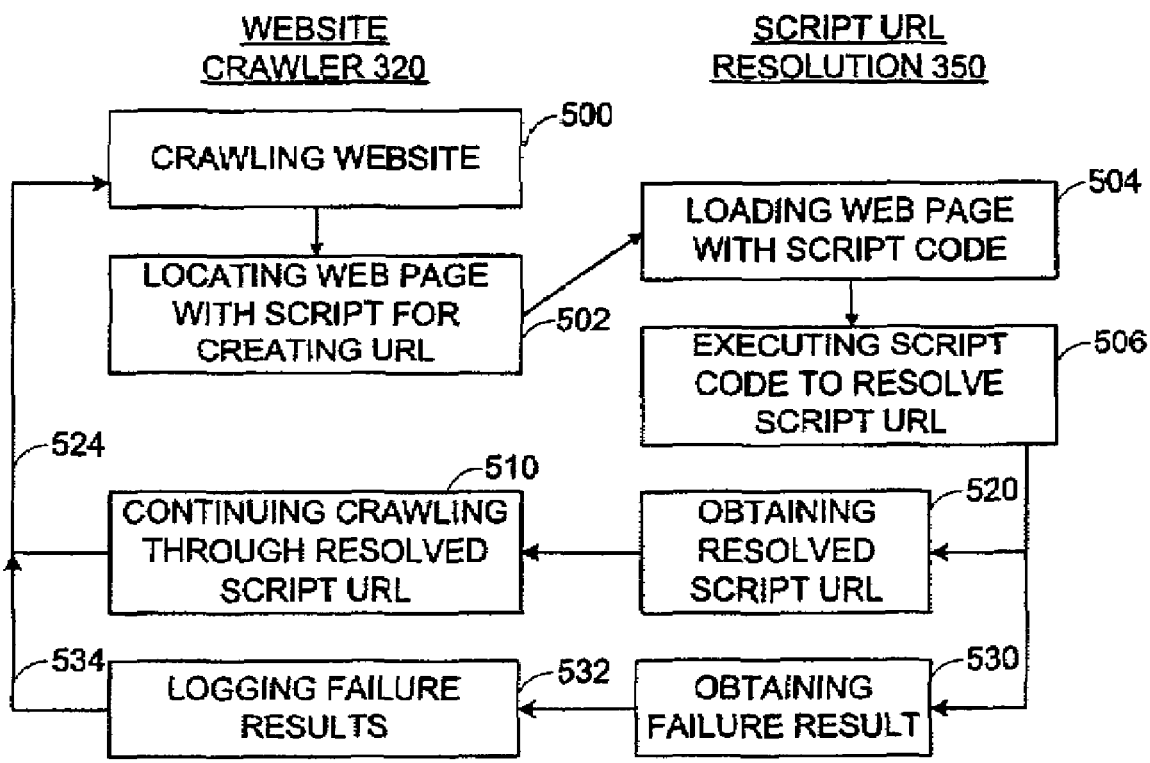
FIG. 7 is a flowchart showing a method for resolving a URL in accordance with another embodiment of the present invention.

The process of FIG. 6 represents the case where the links of the script URLs are extracted successfully. However, there may be situations where errors are encountered while executing the script code. FIG. 7 depicts the process that occurs when the website crawler 320 encounters errors while executing the script code.

The steps of crawling a website (500) to executing script code (506) are similar to those shown in FIG. 6. When the execution of the script code is successful, at least one script URL is resolved and obtained (520). The resolved script URL is reported back to the website crawler 320. In the website crawler 320, the crawling controller 324 controls the website crawler 320 to continue crawling the web page identified by the resolved script URL (510). The crawling is continued on the website containing the identified web page (524) immediately, or in parallel with the crawling of other web pages. Alternatively, the website containing the identified web page may be queued for crawling later in the scan or crawling process.

When the execution of the script code is unsuccessful, a failure result is output by the script URL resolution component 340 (530). The failure result is also returned to the website crawler 320. In the website crawler 320, the error result is logged (532), and the crawling of the current website is continued (534).

The process is repeated until crawling of the original website is completed.

The failure results logged at step 532 may be presented to users during and/or after the scanning.

Figure 8:
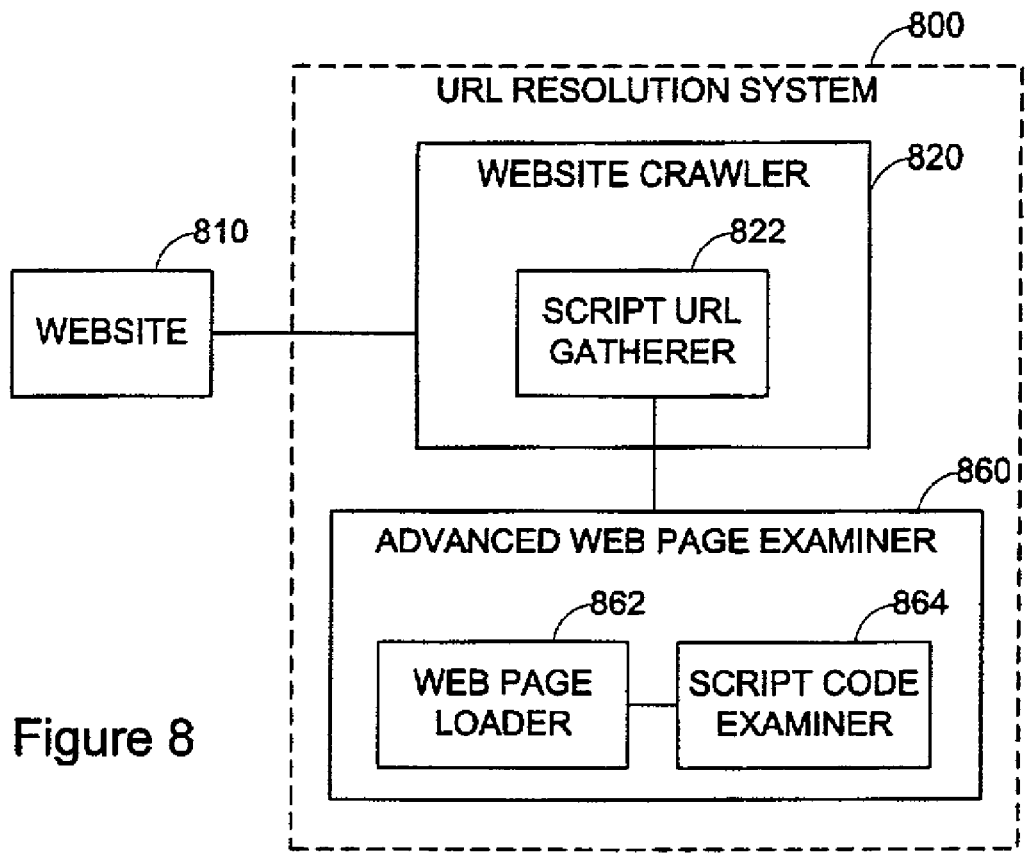
FIG. 8 is a block diagram showing a URL resolution system in accordance with another embodiment of the present invention.

Referring now to FIG. 8, a URL resolution system 800 in accordance with another embodiment of the invention is described. The URL resolution system 800 comprises a website crawler 820 and an advanced web page examiner 860.

The website crawler 820 has a script URL gatherer 822 for gathering script URLs from the advanced web page examiner 860. The advanced web page examiner 860 has a web page loader 862 for loading web pages, and a script code examiner 864 for executing script code in the loaded web pages. The advanced web page examiner 860 may be a part of the URL resolution system 800 or a component external to the system 800.

In operation, the website crawler 820 crawls a website 810. For each URL found on each of those web pages, the script URL gatherer 822 calls a function on the advanced web page examiner 860. It also calls the function for the URL of each web page on which the website crawler 820 crawls. The function takes the received URL as an input parameter and activates the web page loader 862 to load the contents of a web page identified by the received URL.

Then the function activates the script code examiner 864 to examine the loaded web page to obtain any script URLs created by script code in the web page. For example, during the examination of the loaded web page, the script code examiner 864 executes script code found in the loaded web page to obtain script URLs if any. The script code examiner 864 may execute all script code in the loaded web page or only script code that is used to create one or more script URLs. Also, the script code examiner 864 may execute the entire script code or only relevant portions of script code.

The function returns a collection of zero or more resolved script URLs as an output parameter to the script URL gatherer 822. The website crawler 820 may crawl web pages identified by the resolved script URLs. The crawling of those web pages may be carried out immediately or later. The website crawler 820 may crawl those pages in parallel with other web pages.

The website crawler 820 may have a crawling controller similar to crawling controller 324 shown in FIG. 4. Also, the URL resolution system 800 may have or use a presentation unit similar to FIG. 4 or 5.

Figure 9:
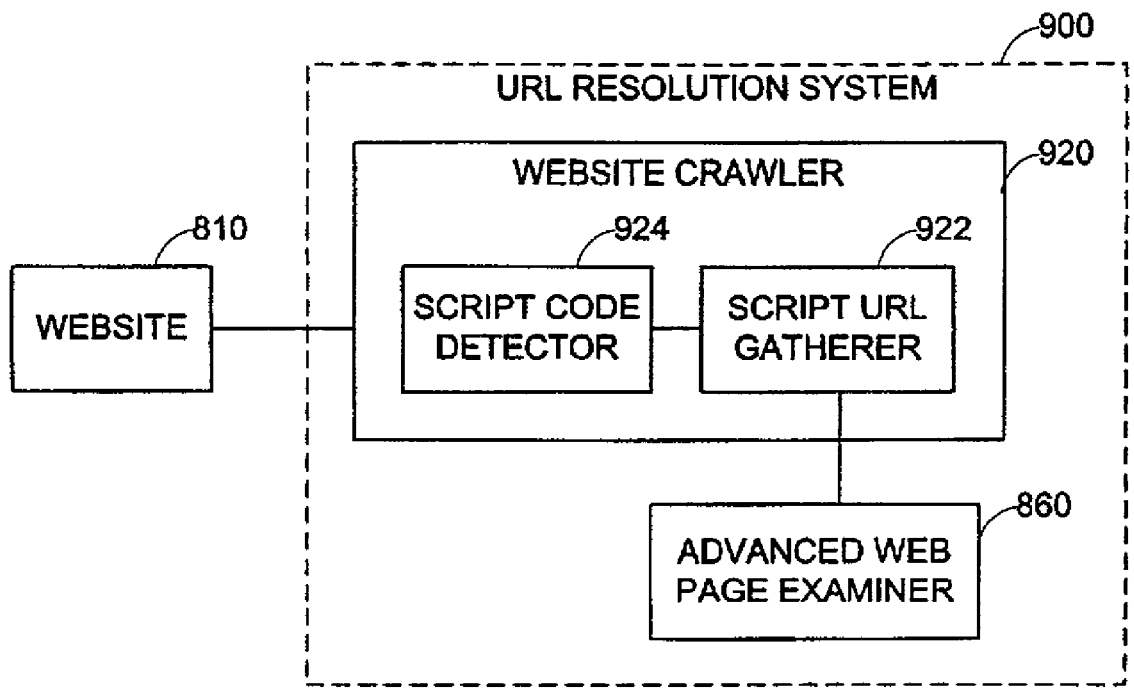
FIG. 9 is a block diagram showing a URL resolution system in accordance with another embodiment of the present invention.

FIG. 9 shows a modification of the URL resolution system 800 shown in FIG. 8. In the modified URL resolution system 900, the website crawler 920 has a script code detector 924. Similarly to the script code detector 322 shown in FIG. 4, the script code detector 924 checks if a web page contains script code that generates one or more script URLs. By using the script code detector 924, the website crawler 920 passes to the advanced web page examiner 860 only URLs of web pages that contain script code that generates one or more script URLs.

The advanced web page examiner 860 may be a part of the URL resolution system 900 or a component external to the system 900.

In the embodiments shown in FIGS. 4-9, the relevant parts of script code are explicitly executed to obtain script URLs. However, as described referring to FIG. 3, script URLs may be obtained by examining script code, without explicit execution of the script code.

Figure 10:
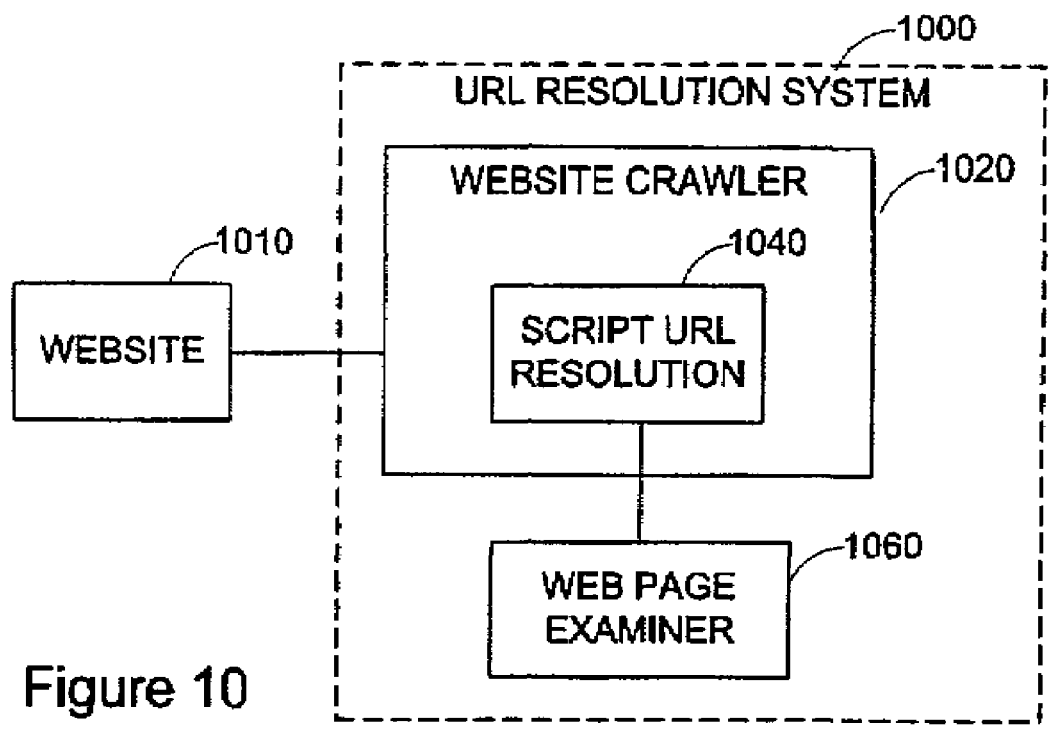
FIG. 10 is a block diagram showing a URL resolution system in accordance with another embodiment of the present invention.
Figure 11:
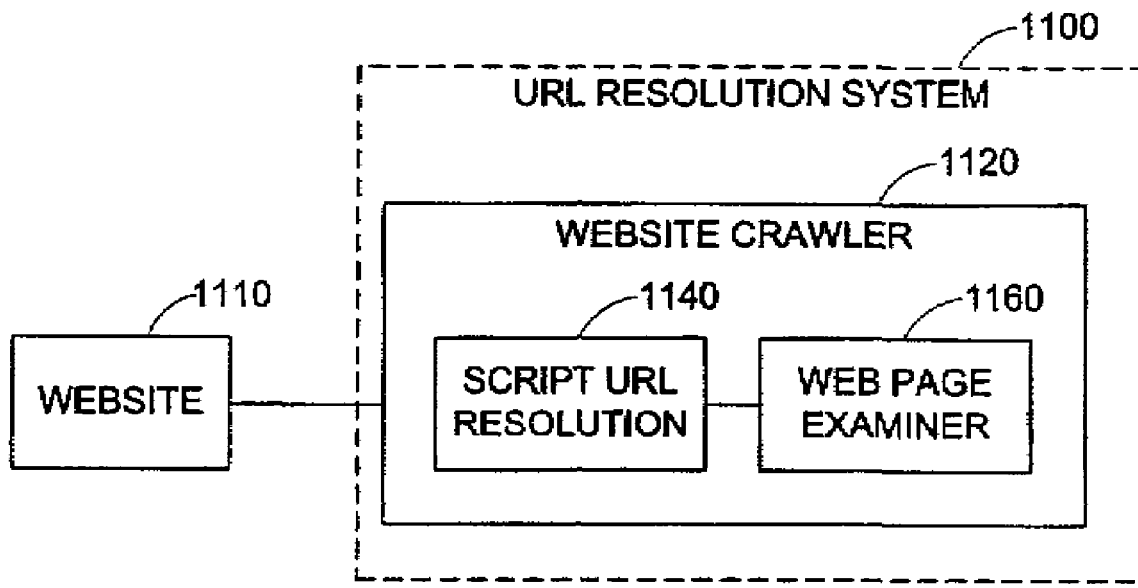
FIG. 11 is a block diagram showing a URL resolution system in accordance with another embodiment of the present invention.

In the above embodiments, the elements of the URL resolution system are described separately, however, two or more elements may be provided as a single element, or one or more elements may be shared with other components in a computer system in which the URL resolution system is installed. For example, in the embodiment shown in FIG. 2, the website crawler 120 and script URL resolution component 140 are shown as separate components. However, as shown in FIG. 10, a URL resolution system 1000 may have a script URL resolution component 1040 as a part of website crawler 1020. A web page examiner 1060 may be a part of the URL resolution system 1000, or a separate component external to the system 1000. Furthermore, as shown in FIG. 11, a URL resolution system 1100 may have a script URL resolution component 1140 and a web page examiner 1160 as components of website crawler 1120. Similar modifications may be made to the embodiments shown in FIGS. 4 and 5.

The URL resolution system of the present invention may be implemented by any hardware, software or a combination of hardware and software having the above described functions. The software code, either in its entirety or a part thereof, may be stored in computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

The invention claimed is:

1. A URL resolution system for resolving Universal Resource Locators (URLs), the URL resolution system comprising:
a processing device executing a website crawler, wherein the website crawler crawling a website comprising one or more webpages and locating and selecting script code that possesses one or more specific portions which are used by web browsers to dynamically create one or more script URLs, and crawling individual web pages associated with the website, the website crawler comprises: a crawling controller receiving results of script code examination from a script URL resolution component, controlling the website crawler based on the examination results, wherein the examination results include a script URL when a script code examination is successful, controlling the web crawler to crawl a web page identified by the script URL, controlling the website crawler to crawl multiple web pages in parallel and receiving user input to define crawling parameters; and
the processing device executing a script URL resolution component, wherein the script URL resolution component loading said one or more webpages, examining said one or more specific portions of the script code selected during the crawling which are used by web browsers to dynamically create one or more script URLs, executing said one or more selected portions of the script code to obtain said one or more script URLs, and resolving the script URLs based on the execution; the processing device executing a presentation unit comprising: wherein the presentation unit comprising an email;
the presentation unit further presenting the examination results to users, the examination result including a failure result.

2. The URL resolution system as claimed in claim 1 wherein the website crawler has a script code detector for determining if a web page uses script code to dynamically create one or more script URLs.

3. The URL resolution system as claimed in claim 2 wherein the script code detector has a notification generating function for generating a notification when the script code detector locates a web page that uses script code to dynamically create one or more script URLs.

4. The URL resolution system as claimed in claim 1 wherein the crawling controller controls the website crawler to crawl the web page identified by the script URL immediately.

5. The URL resolution system as claimed in claim 1 wherein the crawling controller controls the website crawler to queue the web page identified by the script URL for crawling at a later time.

6. The URL resolution system as claimed in claim 1 wherein the script URL resolution component comprises: a web page loading controller instructing a web page examiner to load the web page located by the website crawler; and a script code execution controller instructing the web page examiner to execute said specific portions of the script code used in the loaded web page to obtain said one or more script URLs.

7. The URL resolution system as claimed in claim 6 wherein the URL resolution system includes the web page examiner.

8. The URL resolution system as claimed in claim 6 wherein the script code execution controller uses an execution function of the web page examiner to execute the specific part of the script code.

9. The URL resolution system as claimed in claim 1 wherein the script code detector generates a notification when it locates a web page that uses one or more specific portions of script code to dynamically create one or more script URLs; and a web page loading controller controls loading of the located web page in response to the notification received from the website crawler.

10. The URL resolution system as claimed in claim 1 wherein the script URL resolution component outputs an execution result including the script URL when the execution of the script code is successful; and the website crawler performs crawling of a web page identified by the script URL.

11. The URL resolution system as claimed in claim 1 wherein the URL resolution system comprises a presentation unit to present the examination result to a user.

12. The URL resolution system as claimed in claim 1 wherein the script URL resolution component is provided as a part of the URL resolution system.

13. The URL resolution system as claimed in claim 1 wherein the script URL resolution component is provided as a part of the website crawler.

14. The URL resolution system as claimed in claim 6 wherein the website crawler includes the web page examiner.

15. The URL resolution system as claimed in claim 1 wherein the website has one or more web pages, and the script URL resolution component is a script URL gatherer for locating each URL contained in any of the web pages associated with the website and causing examination of a web page identified by each URL during the crawling to resolve script code contained in the web page to obtain one or more script URLs created by the script code.

16. The URL resolution system as claimed in claim 15 comprising an advanced web page examiner having: a web page loader for loading a web page identified by a URL received from the script URL gatherer; and a script code examiner for examining the loaded web page to resolve any script URL that is created by script code in the loaded web page.

17. The URL resolution system as claimed in claim 15 wherein the script code examiner selects and executes specific portions of the script code found in the loaded web page used to dynamically create one or more script URLs, and returns said one or more script URLs to the script URL gatherer.

18. The URL resolution system as claimed in claim 16 wherein the advanced web page examiner is provided as a part of the URE resolution system.

19. The URL resolution system as claimed in claim 16 wherein the website crawler comprises a script code detector for detecting a web page that uses script code to create at least one script URL; and the script URL gatherer sends to the advanced web page examiner a URL of the web page detected by the script code detector.

20. A method for resolving Universal Resource Locators (URLs), the method comprising steps of:
electronically receiving user input defining crawling parameters; electronically crawling a website comprising one or more webpages in response to the defined crawling parameters; electronically locating and selecting script code that possess one or more specific portions which are used by web browsers to dynamically create one or more script URLs, and further selecting one or more specific portions of said script code which creates one or more script URLs by locating a web page of the website, which uses script code to dynamically create one or more script URLs; electronically loading said one or more web pages, electronically examining said one or more specific portions of the script code selected during the crawling which are used by web browsers to dynamically create one or more script URLs;
electronically executing the one or more selected portions of the script code by instructing a web page examiner to execute the specific part of the script code to obtain said one or more script URLs; electronically resolving the script URLs based on the execution; electronically crawling of a web page identified by the script URL in parallel to crawling of other web pages;
electronically obtaining examination results including said one or more script URLs when the examination step is successful and a failure result when the examination step fails to obtain said one or more script URLs; and electronically presenting to a user in an email the examination result including said one or more script URLs and the failure result.

21. The method as claimed in claim 20 wherein the step of crawling of a web page comprises a step of crawling the web page identified by the script URL immediately.

22. The method as claimed in claim 20 wherein the step of crawling of a web page comprises steps of queuing the web page identified by the script URL; and crawling the queued web page at a later time.

23. The method as claimed in claim 20 wherein the step of locating script code comprises steps of finding a URL in the web pages; and examining a web page identified by the URL to locate script code in the web page identified by the URL.

24. The method as claimed in claim 23 comprising the additional step of selecting a web page that contains script code that is used to dynamically create one or more script URL, and wherein the examining step examines the selected web page.

25. The URL resolution system as claimed in claim 20 wherein script URL resolution component identifies said one or more script URLs by executing said portions of said script code used to dynamically create one or more script URLs.

* * * * *